United States Patent
Peng et al.

(10) Patent No.: US 11,215,881 B2
(45) Date of Patent: Jan. 4, 2022

(54) SWITCHABLE BROADBAND WAVEPLATE

(71) Applicant: Facebook Technologies, LLC, Menlo Park, CA (US)

(72) Inventors: Fenglin Peng, Redmond, WA (US); Lu Lu, Kirkland, WA (US); Jacques Gollier, Sammamish, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/824,641

(22) Filed: Mar. 19, 2020

(65) Prior Publication Data

US 2020/0310204 A1    Oct. 1, 2020

Related U.S. Application Data

(60) Provisional application No. 62/824,971, filed on Mar. 27, 2019.

(51) Int. Cl.
*G02F 1/1343* (2006.01)
*G02F 1/141* (2006.01)
*G02F 1/03* (2006.01)
*G02F 1/13363* (2006.01)
*G02F 1/137* (2006.01)

(52) U.S. Cl.
CPC ...... *G02F 1/134363* (2013.01); *G02F 1/0311* (2013.01); *G02F 1/133632* (2013.01); *G02F 1/141* (2013.01); *G02F 1/13775* (2021.01); *G02F 1/133638* (2021.01)

(58) Field of Classification Search
CPC ............. G02F 1/134363; G02F 1/0311; G02F 1/133632; G02F 1/141; G02F 1/13775; G02F 1/133638
See application file for complete search history.

(56) References Cited

U.S. PATENT DOCUMENTS

| | | | |
|---|---|---|---|
| 6,046,786 A * | 4/2000 | Sharp | G02F 1/13363 349/119 |
| 6,649,087 B1 * | 11/2003 | Dultz | C09K 19/02 252/299.01 |
| 2018/0129018 A1 * | 5/2018 | Cheng | G02B 27/286 |

OTHER PUBLICATIONS

International Search Report and Written Opinion issued in PCT Application No. PCT/US2020/024411, dated Jun. 9, 2020 (15 pages).
Srivastava, A., et al., "Ferroelectric liquid crystals: Excellent tool for modern displays and photonics," Journal of the Society for Information Display, 23(6), 2015, pp. 253-272 (20 pages).

* cited by examiner

*Primary Examiner* — Nathanael R Briggs
(74) *Attorney, Agent, or Firm* — Millburn IP PLLC

(57) ABSTRACT

An optical waveplate is provided. The optical waveplate includes a plurality of liquid crystal ("LC") layers stacked together. At least one of the plurality of LC layers includes LC molecules that are in-plane switchable by an external field to switch the optical waveplate between states of different phase retardances.

18 Claims, 13 Drawing Sheets

100

| 101 |
|---|
| 102 |
| 103 |
| 104 |

100

| 101 |
| --- |
| 102 |
| 103 |
| 104 |

FIG. 1

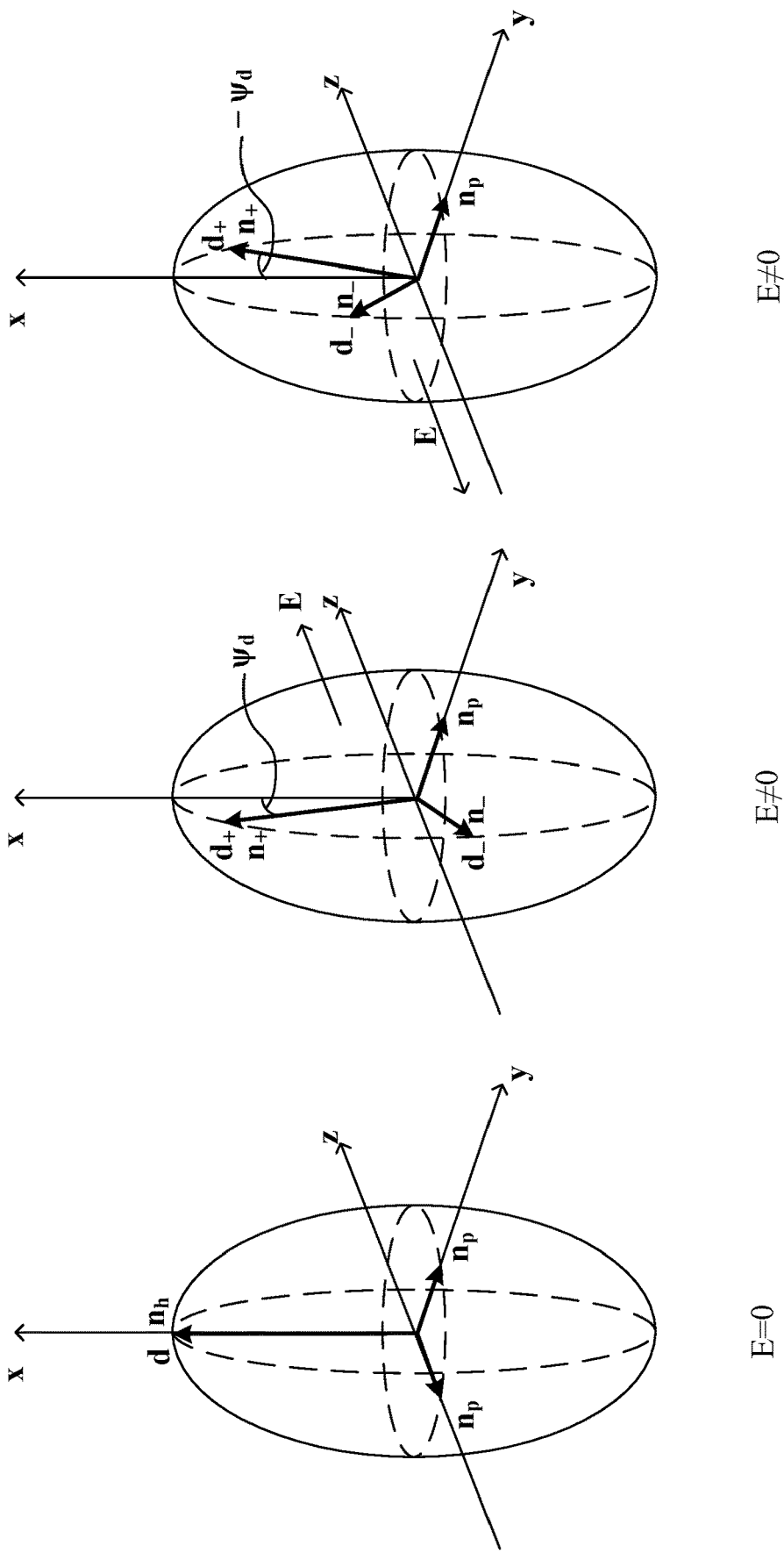

100

| | |
|---|---|
| 101 | (d2, ψ1=0°) |
| 102 | (d2, ψ2=0°) |
| 103 | (d1, ψ3=60°) |
| 104 | (d1, ψ4=0°) |

| | |
|---|---|
| 101 | (d2, $\psi 1=0°$) |
| 102 | (d2, $\psi 2=90°$) |
| 103 | (d1, $\psi 3=60°$) |
| 104 | (d1, $\psi 4=-30°$) |

FIG. 5B

SWITCHABLE BROADBAND WAVEPLATE

CROSS-REFERENCE TO RELATED APPLICATION

This application claims priority to U.S. Provisional Application No. 62/824,971, filed on Mar. 27, 2019, the entire content of which is incorporated by reference herein.

TECHNICAL FIELD

The present disclosure relates to optical devices and, more specifically, to a switchable broadband waveplate.

BACKGROUND

Waveplates have been implemented in many instruments and optical systems for polarization control. A waveplate controls the polarization by retarding (or delaying) a component of polarization (or a polarization component) with respect to an orthogonal component. Retardance is a phase shift (hence "retardance" may also be referred to as "phase retardance") between the polarization component projected along a fast axis and the orthogonal component projected along a slow axis. Waveplates utilizing tunable birefringent materials, e.g., liquid crystal ("LC") waveplates, have the advantage of non-mechanically tuning of the retardance. For polarimetric imaging systems, LC waveplates are highly desirable to have broadband performance such as covering wavelengths ranging from visible ("VIS") to near infrared ("NIR") regions, a large acceptance angle (i.e., large incident angle), low residual retardance, fast response, and a capability of being switched between different states, for example, between a substantially zero retardance and a non-zero retardance value (e.g. half-wave retardance, quarter-wave retardance).

LC waveplates based on nematic LCs where the retardance is adjusted by manipulating the tilt angle of nematic LC molecules may not achieve the above-mentioned features at the same time. For example, the response time of a nematic LC waveplate is on the order of milli-second ("ms"), the residual retardance is large because nematic LC molecules may not be fully reoriented along an external electric field. Ferroelectric liquid crystals ("FLCs") can offer a fast switching that is typically less than 100 micro-seconds ("μs"), an excellent viewing angle, and low residual retardance due to intrinsic in-plane switching behaviors. Thus, FLCs can provide a solution for enhanced switchable LC waveplates.

SUMMARY

One aspect of the present disclosure provides an optical waveplate. The optical waveplate includes a plurality of liquid crystal ("LC") layers stacked together. At least one of the plurality of LC layers includes LC molecules that are in-plane switchable by an external field to switch the optical waveplate between states of different phase retardances.

Another aspect of the present disclosure provides an optical lens assembly. The optical lens assembly includes an optical lens and an optical waveplate coupled with the optical lens. The optical waveplate includes a plurality of liquid crystal ("LC") layers stacked together. At least one of the plurality of LC layers includes LC molecules that are in-plane switchable by an external field to switch the optical waveplate between states of different phase retardances.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings:

FIG. 1 illustrates a schematic cross-sectional view of an optical waveplate according to an embodiment of the disclosure;

FIGS. 4A-4C illustrate effective refractive index ellipsoids of the FLC cell according to an embodiment of the disclosure;

FIG. 5A illustrates a schematic diagram of the optical waveplate in a first state according to an embodiment of the disclosure;

FIG. 5B illustrates a schematic diagram of the optical waveplate in a second state according to an embodiment of the disclosure;

DETAILED DESCRIPTION

Figure 2:
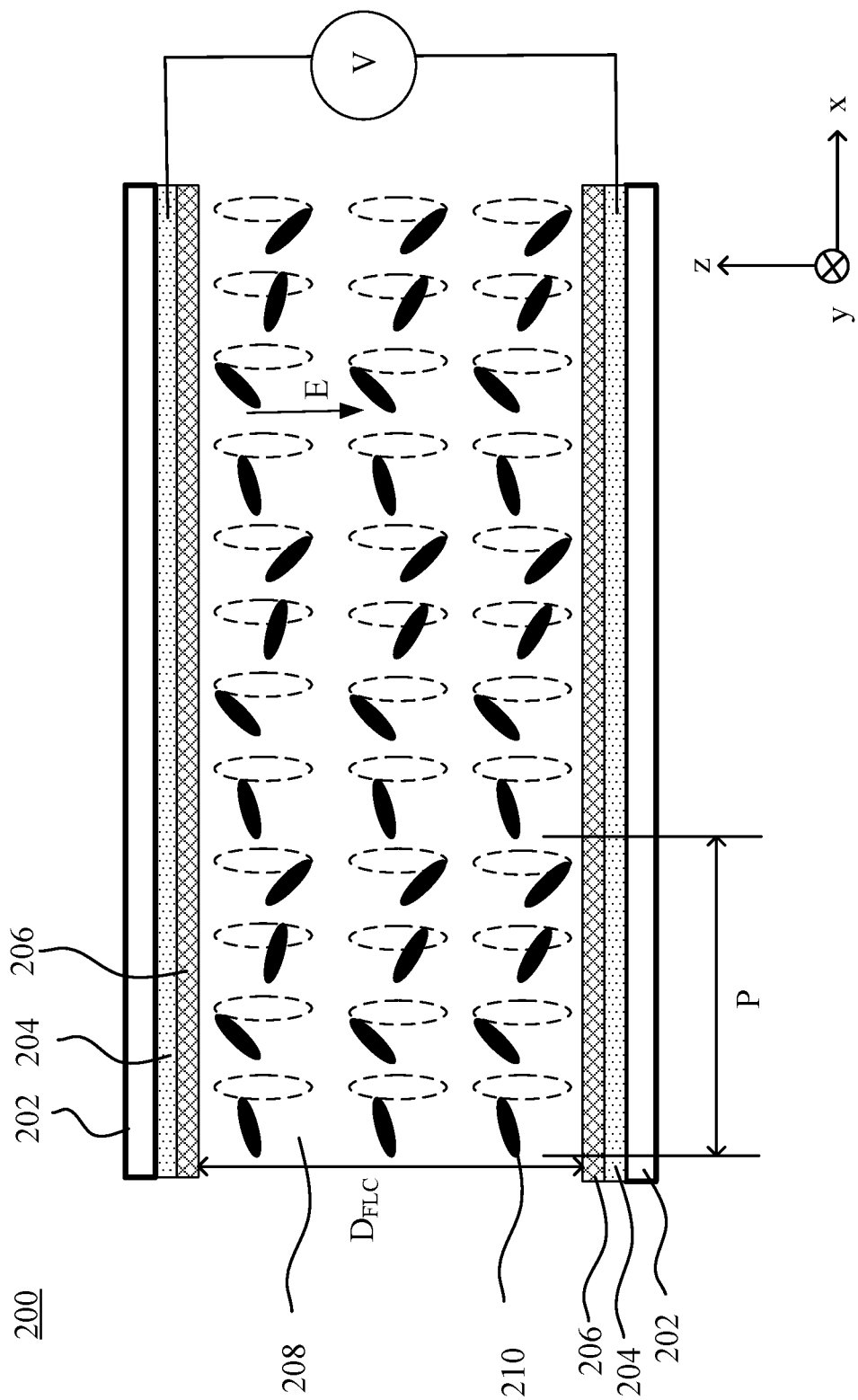
FIG. 2 illustrates a schematic cross-sectional view of a ferroelectric liquid crystal ("FLC") cell according to an embodiment of the disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or a combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

The term "processor" used herein may encompass any suitable processor, such as a central processing unit ("CPU"), a graphics processing unit ("GPU"), an application-specific integrated circuit ("ASIC"), a programmable logic device ("PLD"), or a combination thereof. Other processors not listed above may also be used. A processor may be implemented as software, hardware, firmware, or a combination thereof.

The term "controller" may encompass any suitable electrical circuit, software, or processor configured to generate a control signal for controlling a device, a circuit, an optical element, etc. A "controller" may be implemented as software, hardware, firmware, or a combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("ROM"), a flash memory, etc.

The present disclosure provides an optical waveplate that has broadband performance such as covering wavelengths ranging from visible ("VIS") to near infrared ("NIR") regions, a large acceptance angle (e.g., a large incident angle), a low residual retardance, a fast response, and a capability of being switched between different states such as between a substantially zero retardance (or an equivalent full-wave retardance, e.g., one full-wave retardance, two full-wave retardance, etc.) and a non-zero fractional-wave retardance (e.g. half-wave retardance, quarter-wave retardance). The optical waveplate includes a plurality of liquid crystal ("LC") layers stacked together. At least one of the plurality of LC layers may include LC molecules that are in-plane switchable by an external field (e.g., an electric field, such as a voltage) to switch the optical waveplate between states of different retardances.

In some embodiments, when the optical waveplate provides a non-zero fractional-wave phase retardance, the plurality of LC layers may be configured to rotate a polarization of a broadband light (e.g., a polychromatic light) over a range of wavelengths and a range of incident angles. Azimuthal angles of LC molecules in one or more of the plurality of LC layers and/or thickness(es) of the one or more of the plurality of LC layers may be configured such that the broadband light passes through each of the plurality of LC layers consecutively, and an amount of a phase retardance caused by the plurality of LC layers may be substantially wavelength independent over the range of wavelengths and the range of incident angles. In some embodiments, a cumulative rotation of the polarization for all bands of light within the broadband light may result in a first polarization being converted to a second polarization different from the first polarization.

In some embodiments, when the optical waveplate provides a substantially zero retardance (or an equivalent full-wave retardance, e.g., one full-wave retardance, two full-wave retardance, etc.), the plurality of LC layers may be configured to substantially maintain a polarization of the broadband light (e.g., a polychromatic light) over the range of wavelengths and the range of incident angles. In some embodiments, the relative orientations of the plurality of LC layers may also be configured.

In some embodiments, the optical waveplate may include a plurality of ferroelectric liquid crystal ("FLC") cells stacked together where each FLC cell includes an FLC layer. At least one of the FLC layers may include FLC molecules configured to be in-plane switchable when subject to an external electric field. Through the in-plane switching, an azimuthal angle of an effective refractive index ellipsoid of the FLC layer may be configured, thereby switching the optical waveplate between states of different retardances. In some embodiments, the at least one FLC layer may be controllable by an external electric field to configure the azimuthal angle through in-plane switching an orientation of an optic axis of the FLCs to switch the optical waveplate between states of different retardance.

In some embodiments, when the optical waveplate provides a non-zero fractional-wave phase retardance, the plurality of FLC layers may be configured to rotate a polarization of a broadband light (e.g., a polychromatic light) over a range of wavelengths and a range of incident angles. In some embodiments, azimuthal angle(s) of the effective refractive index ellipsoid(s) of one or more of the plurality of FLC layers and/or thickness(es) of the one or more of the plurality of FLC layers may be configured, such that the broadband light passes through each of the plurality of FLC layers consecutively, and an amount of a phase retardance caused by the plurality of FLC layers may be substantially wavelength independent over the range of wavelengths and the range of incident angles. A cumulative rotation of the polarization for all bands of light within the broadband light may result in a first polarization being converted to a second polarization different from the first polarization. In some embodiments, when the optical waveplate provides a substantially zero retardance (or an equivalent full-wave retardance, e.g., one full-wave retardance, two full-wave retardance, etc.), the plurality of FLC layers may be configured to substantially maintain a polarization of the broadband light (e.g., a polychromatic light) over the range of wavelengths and the range of incident angles. In some embodiments, the relative orientations of the plurality of FLC layers may also be configured.

Figure 1:
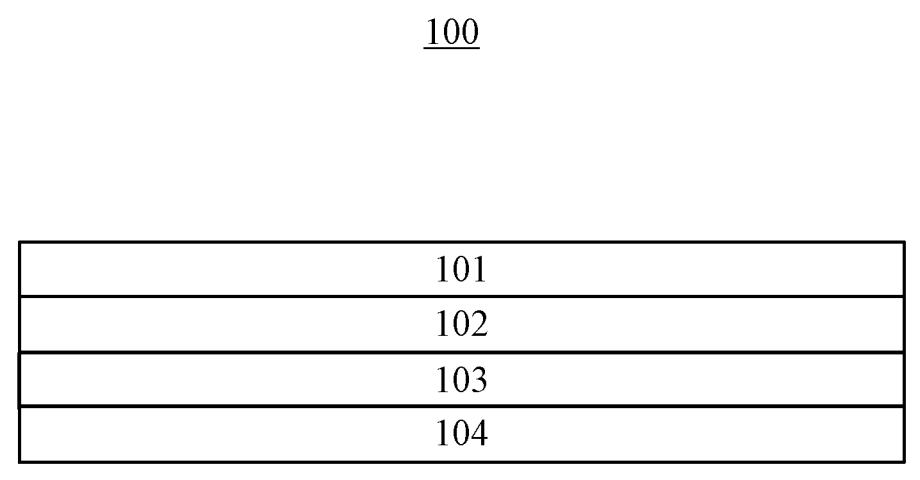

FIG. 1 illustrates a schematic diagram of an optical waveplate 100 according to an embodiment of the disclosure. The optical waveplate 100 may include a plurality of cells stacked together. For illustrative purposes, FIG. 1 shows that the optical waveplate 100 includes four cells 101, 102, 103, and 104. The optical waveplate 100 may include any suitable number (e.g., two, three, five, six, etc.) of cells. At least one (e.g., each) of the cells 101, 102, 103, or 104 may function as an individual retarder and may include two substrates arranged opposite to each other and a birefringent medium layer disposed between the two substrates. In some embodiments, the birefringent medium layer may include at least an FLC layer, i.e., a layer of FLCs. In some embodiments, at least one (e.g., each) of the cells 101, 102, 103, or 104 may be independently controlled by an external electric field (e.g., an external voltage) to configure an azimuthal angle of the effective refractive index ellipsoid of the FLC layer through in-plane switching an optic axis of the FLCs, through which switching the electrically induced biaxiality (e.g., in-plane birefringence) of the FLC layer may be configured. The details of configuring an azimuthal angle of the effective refractive index ellipsoid of the FLC layer through in-plane switching the optic axis of the FLCs will be described below with reference to FIGS. 2-4C.

In the present disclosure, through configuring the electrically induced biaxiality (e.g., in-plane birefringence) of the FLCs in a cell (e.g., one of cells 101, 102, 103, or 104) and the thickness of the cell, the cell may be configured to provide various retardances, such as a $\lambda/4$ retardance, a $\lambda/2$ retardance, or a $\lambda$ retardance, where $\lambda$ represents a wavelength of an incident light of the optical waveplate 100. In some embodiments, for a cell, various retardances may be realized through configuring the azimuthal angle of the effective refractive index ellipsoid of the FLC layer included in the cell. Thus, for the optical waveplate 100 including a plurality of cells 101, 102, 103, and 104 stacked together, various combinations of retardances may be achieved by applying different electric fields to different cells. For example, at least two electric fields applied to at least two cells may be different. In some embodiments, the electric fields applied to all cells may be different. The different combinations of retardances provided by the cells 101, 102, 103, and 104 may result in different retardances of the optical waveplate 100. In some embodiments, the different combinations of retardances may be switched from one combination to another by adjusting one or more electric fields applies to one or more of the cells 101, 102, 103, and 104. As a result, the optical waveplate 100 may be switchable between different states having different retardance values. At each state, the optical waveplate 100 may be associated with a retardance, which may be a sum of the retardances provided by the cells 101, 102, 103, and 104 included in the optical waveplate 100. For example, the states of the optical waveplate 100 may include a substantially zero retardance state, a half-wave plate retardance state, a quarter-wave plate retardance state, a one-wave plate retardance state, etc. In some embodiments, the optical waveplate 100 may be a zero-order waveplate. In some embodiments, the optical waveplate 100 may be a multiple-order waveplate.

The in-plane switching of the optic axis of the FLCs may provide the optical waveplate 100 with a fast switching speed, excellent viewing angle characteristics, and a low residual retardance. Furthermore, as the dispersion of the retardance of the FLCs may be dependent on the external electrical field (e.g., may be voltage dependent), through tuning the dispersion of the retardance of at least one of the cells 101, 102, 103, or 104 included in the optical waveplate 100 by adjusting an electric field (e.g., a voltage) applied to at least one of the cells 101, 102, 103, or 104, the wavelength dependency of the optical waveplate 100 may be compensated to operate as a broadband optical waveplate.

Figure 3:
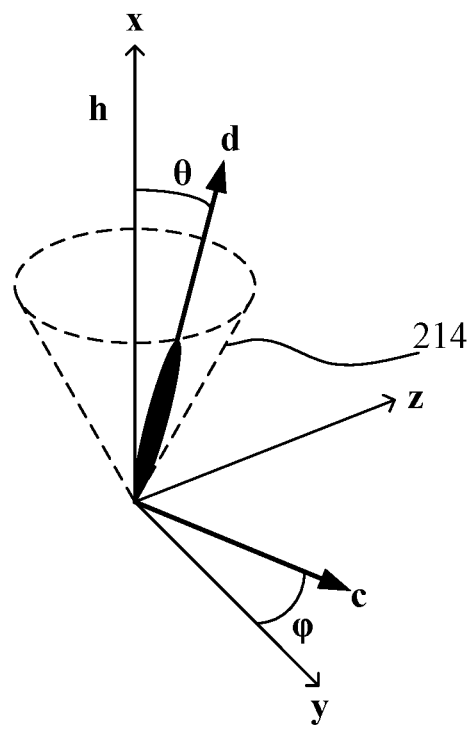
FIG. 3 illustrates a schematic view of an FLC molecule according to an embodiment of the disclosure.

FIG. 2 illustrates a schematic cross-sectional view of a cell 200 included in the optical waveplate 100, and FIG. 3 illustrates a schematic view of an FLC molecule 210 according to an embodiment of the disclosure. The cell 200 may be an embodiment of any of the cells 101, 102, 103, or 104 shown in FIG. 1. As shown in FIG. 2, the cell 200 may include two substrates 202 arranged opposite to each other. The substrates 202 may be substantially transparent in the visible band (about 380 nm to about 700 nm). In some embodiments, the substrates 202 may also be transparent in at least a portion of the infrared ("IR") band (about 700 nm to about 1 mm). The substrates 202 may include a suitable material that is substantially transparent to lights having wavelengths in the above-listed wavelengths ranges, e.g., $SiO_2$, plastic, sapphire, etc. The substrate 202 may be rigid, semi-rigid, flexible, or semi-flexible. In some embodiments, the substrate 202 may be a part of another optical device or another optoelectrical device. For example, the substrate 202 may be a part of a functional device, such as a display screen. In some embodiments, the substrate 202 may be a part of an optical lens assembly, such as a lens substrate of the optical lens assembly. An electrode 204, e.g., formed based on indium tin oxide ("ITO"), may be disposed at each of the opposing surfaces of the substrates 202 and may be configured to apply an electric field. In some embodiments, an alignment structure 206 may be disposed at each of the opposing surfaces of the two electrodes 204. An FLC layer 208 may be sandwiched between the two alignment structures 206. The cell 200 including the FLC layer 208 may be referred to as an FLC cell 200 in the following description.

Referring to FIG. 2 and FIG. 3, within a ferroelectric smectic C* phase (the symbol "*" refers to the chiral nature), FLC molecules 210 included in the FLC layer 208 may be arranged in a layered geometry where the smectic layers are perpendicular to the substrates 202. The FLC molecules 210 may be tilted with respect to the layer normal, which may be defined by an alignment direction of the FLC cell 200 (e.g., a rubbing direction of the alignment structure 206, e.g., along an x-axis in FIG. 2). The FLC molecules 210 may be aligned, on average, along a local unit director d=cos θh+sin θc, where θ is a smectic tilt angle, h is a helix (e.g., twisting) axis normal to the smectic layer and parallel to an x-direction, and c is a c-director. As shown in FIG. 3, the director d of the FLC molecules 210 may lie on a smectic cone 214 and may rotate in a helical manner around a uniform twisting axis h forming the FLC helix. This rotation is described by the azimuthal angle φ around the cone 214, where the azimuthal angle φ specifies the orientation of the c-director (c=cos φy+sin φz) in the plane perpendicular to h.

In some embodiments, the FLC cell 200 may be operated under an electrically suppressed helix ferroelectric liquid crystal ("ESHFLC") mode. For illustrative purposes, FIG. 2 shows an ESHFLC cell with a homogenous or planar alignment, e.g., an anti-parallel planar alignment. In some embodiments, the ESHFLC cell may be configured with another type of alignment, such as a parallel planar alignment. The helix pitch ("P" in FIG. 2) of the ESHFLC may be parallel to the substrates 202. The helix pitch P may be smaller than or equal to the thickness ("$D_{FLC}$" in FIG. 2) of the FLC cell 200. One of the challenges for implementing FLCs in photonic applications is the intrinsic diffraction that occurs due to ferroelectric domains and the periodic structure of the FLC helix. In some embodiments, a constraint on the FLC helix and the anchoring energy may be imposed, such that the ESHFLC mode may provide a high contrast ratio and a fast electro-optic response without intrinsic diffraction. To achieve high optical quality for the ESHFLC, the anchoring energy ("W") and the elastic energy ("$K^2$") of the ESHFLC helix are configured to satisfy $K^2 \geq W/D_{FLC}$. To achieve the desired anchoring energy W for specified FLC materials and thickness of the FLC cell 200, in some embodiments, photoalignment technology may be used to tune the anchoring energy W by controlling the irradiation doses. For example, the alignment structure 206 may be a photoalignment structure. In some embodiments, the alignment structure 206 may be omitted, and the FLCs in the bulk may be aligned by an external field, e.g., a light field (e.g. photo-aligned), an electric field, or a magnetic field.

FIGS. 4A-4C illustrate effective refractive index ellipsoids of the FLC layer 208 operating under the ESHFLC mode. As shown in FIG. 4A, at E=0 (i.e., zero electric field), the electric field-free effective refractive index ellipsoid may be uniaxially anisotropic with the optic axis parallel to the helix axis (the x-direction). The refractive indices $n_h$ and $n_p$ correspond to the optic axes along and perpendicular to the helix axis, respectively. As shown in FIG. 4B, when an external electric field is applied across the FLC cell 200, the electric-field-induced anisotropy may be biaxial with the two in-plane optic axes d+ and d− rotated by an azimuthal angle $\psi_d$. In a low electric field range, the electric field dependence of the azimuthal angle $\psi_d$ may be substantially linear, i.e., $\psi_d \propto E$ (the azimuthal angle being linearly proportional to E), and the electrically induced part of the principal refractive indices, $n_\pm$ and $n_z$ are typically dominated by the Kerr-like nonlinear terms proportional to $E^2$. For a normally incident light, the refractive index difference that is also referred as the electrically induced biaxiality (e.g., in-plane birefringence) may be calculated as $\Delta n = n_{+} - n_{-} \approx K_{kerr} E^2$, where $K_{kerr}$ represents the Kerr constant of the FLC material, and the indices $n_+$ and $n_{p-}$ correspond to the optic axes $d_+$ and $d_-$, respectively.

Referring to FIG. 4C, in some embodiments, reversing the direction of the external electric field may flip the FLC molecules to the other side away from the alignment direction. For example, when the azimuthal angle of the effective refractive index ellipsoid of the FLC cell 200 is $\psi_d$ under an external electric field of +E, then the azimuthal angle of the effective refractive index ellipsoid of the FLC cell may be $-\psi_d$ under an external electric field of −E. The two positions may be switched from one to another by switching the polarity of the electric field E, which provides an intrinsic in-plane switching of the FLCs. Referring to FIG. 4B and FIG. 4C, the in-plane switching of the FLCs may be referred to as a switching of an azimuthal angle of the effective refractive index ellipsoid of the FLC layer 208 within a plane formed by the helix axis and the optic axis d (e.g., $d_+$ or $d_−$).

FIG. 5A is a schematic diagram of the optical waveplate 100 in a first state, and FIG. 5B is a schematic diagram of the optical waveplate 100 in a second state switched from the first state. An electric field may be applied (not shown) to cause a change in the azimuthal angle of the effective refractive index ellipsoid of the FLC layer included in one or more FLC cells 101, 102, 103, or 104, which enables the optical waveplate 100 to be switched between the first state and the second state. The first state and the second state may be any of the states described above. The first state may be different from the second state.

For illustrative purposes, the optical waveplate 100 in the first state shown in FIG. 5A may function as a half-wave plate, which may reverse the handedness of a circularly polarized incident light. For example, the optical waveplate 100 may convert a right-handed circularly polarized incident light to a left-handed circularly polarized light and vice versa. The optical waveplate 100 in the second state shown in FIG. 5B may have a substantially zero retardance, where the incident light may substantially remain the same polarization state after propagating through the optical waveplate 100. In some embodiments, the substantially zero retardance may be realized by a self-compensation configuration.

In some embodiments, the same FLC materials may be included in the FLC cells 101, 102, 103, and 104. It is understood that in other embodiments, the FLC materials included in the cells 101, 102, 103, and 104 may be different. For discussion purposes, the thicknesses of the FLC cells 101, 102, 103, and 104 are presumed to be 1.37 µm, 1.37 µm, 2.74 µm, and 2.74 µm, respectively. It is understood that the cells may have any other suitable thicknesses. In an example in which the same FLC materials are included in the cells 101, 102, 103, and 104, and the thicknesses are 1.37 µm, 1.37 µm, 2.74 µm, and 2.74 µm, respectively, in the first state shown in FIG. 5A, the azimuthal angles of the effective refractive index ellipsoid of the FLC layers in the FLC cells

101, 102, 103, and 104 may be configured, by applying a suitable electric field to each cell (including a zero electric field, i.e., not applying an electric field), to be ψ1=0°, ψ2=0°, ψ3=60°, ψ4=0°, respectively, to realize the half-wave retardance. In the second state shown in FIG. 5B, the azimuthal angles of the effective refractive index ellipsoid of the FLC layers in the FLC cells 101, 102, 103, and 104 may be configured, by applying a suitable electric field to each cell (including a zero electric field, i.e., not applying an electric field), to be ψ1=0°, ψ2=90°, ψ3=60°, ψ4=−30°, respectively, to realize the zero-retardance. In general, the design principle to achieve the substantially zero retardance may be as follows: |ψ1−ψ2|=90° and |ψ3−ψ4|=90°. The angles ψ1, ψ2, ψ3, and ψ4 may be any appropriate values that satisfy the above equations. The second state may also be referred to as a self-compensation configuration.

Thus, through applying a suitable electric field to each cell to adjust the azimuthal angles ψ1, ψ2, ψ3, and ψ4, the optical waveplate 100 may be switched between the first state and the second state, e.g., between operating as a half-wave plate and operating as a substantially zero retardance waveplate. Accordingly, when a circularly polarized light is incident onto the optical waveplate 100, the handedness of the transmitted circularly polarized light may be reversed (as in the first state shown in FIG. 5A) or maintained (as in the second state shown in FIG. 5B).

Although a half-wave retardance (i.e., when the optical waveplate 100 is a half-wave plate) and a substantially zero retardance are used as an example to explain the present disclosure shown in FIG. 5A and FIG. 5B, respectively, a person having ordinary skills in the art can appreciate that through configuring the FLC materials included in the FLC cells, the thicknesses of the FLC cells, and the azimuthal angles of the effective refractive index ellipsoid of the FLC layers in the FLC cells, the optical waveplate 100 at the first state shown in FIG. 5A may have a retardance other than a half-wave retardance, and/or the optical waveplate 100 at the second state shown in FIG. 5B may have a retardance other than a substantially zero retardance.

When the azimuthal angle of the effective refractive index ellipsoid of the FLC layer can be adjusted by an external electric field, i.e., when the retardance of the FLC cell can be adjusted by an external electric field, the FLC cell may be referred as an active cell. The optical waveplate 100 may include one or more active cells, where one or more electric fields may be applied to the one or more active cells to configure the azimuthal angle of the effective refractive index ellipsoid of the corresponding FLC layer. In some embodiments, in addition to or as an alternative to the active cells, the optical waveplate 100 may include one or more passive cells having a constant retardance. The one or more passive cells may each be configured with a predetermined retardance. The combination of the retardances of the one or more active cells and the one or more passive cells may result in an optical waveplate 100 having a specified performance. On one hand, the optical waveplate 100 having both an active cell and a passive cell may still be switchable between different states of predetermined retardances. On the other hand, the fabrication process and cost, the power consumption, and/or the thickness of the optical waveplate 100 may be reduced.

For example, referring to FIGS. 5A and 5B, when the optical waveplate 100 is switched between the first state shown in FIG. 5A and the second state shown in FIG. 5B, only the azimuthal angles of the effective refractive index ellipsoids of the FLC layers in the cells 102 and 104 are changed, while the azimuthal angles of the effective refractive index ellipsoids of the FLC layers in the cells 101 and 103 are not changed (i.e., ψ1 remains to be 0° and ψ3 remains to be 60°). That is, when the optical waveplate 100 is switched between the first state shown in FIG. 5A and the second state shown in FIG. 5B, the retardances of the cells 101 and 103 may be constant, fixed, or maintained. Thus, in some embodiments, the cells 101 and 103 may be configured as passive cells (with no electric field applied) with predetermined constant retardances and/or dispersion of retardances, without affecting the performance of the optical waveplate 100.

In some embodiments, the passive cell may include a liquid crystal polymer ("LCP") layer with a predetermined retardance and/or dispersion of retardance. In some embodiments, the passive cell may include a compensation film with a predetermined retardance and/or dispersion of retardance, such as an A-plate. A positive A-plate may have $n_x > n_y = n_z$, and a negative A-plate may have $n_x < n_y = n_z$, where $n_x$, $n_y$, $n_z$ are the refractive indices in an x-axis, y-axis, and z-axis of the refractive index ellipsoid of the A-plate, respectively. The present disclosure does not limit the types of the passive cells as long as the passive cells can provide a specific retardance and/or dispersion of retardance, and can function together with the active cells to realize an optical waveplate with a predetermined performance, e.g., broadband performance such as covering wavelengths ranging from VIS to NIR regions, a large acceptance angle, a low residual retardance, a fast response, and a capability of being switched between different states such as between a substantially zero retardance and a non-zero retardance value, etc.

Simulation results regarding the broadband and large acceptance angle performance of the optical waveplate 100 are explained with reference to FIGS. 6-9, where the light incident onto the optical waveplate 100 (i.e., the input light) is presumed to be a left-handed circularly polarized light whose Stokes parameter S3=−1.0.

Figure 6:
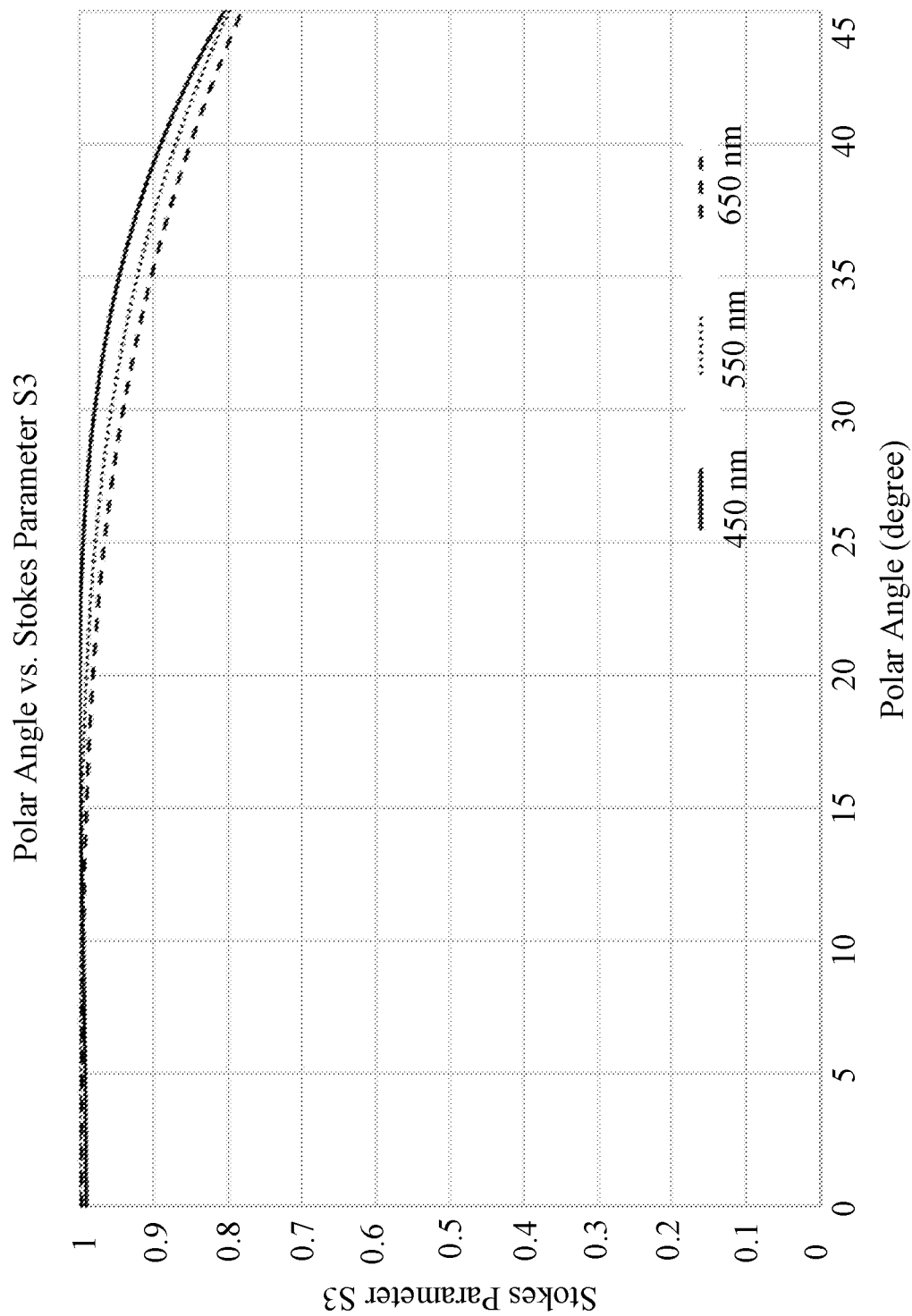
FIGS. 6 and 7 illustrate simulation results showing broadband and large acceptance angle performance of the optical waveplate shown in FIG. 5A.
Figure 7:
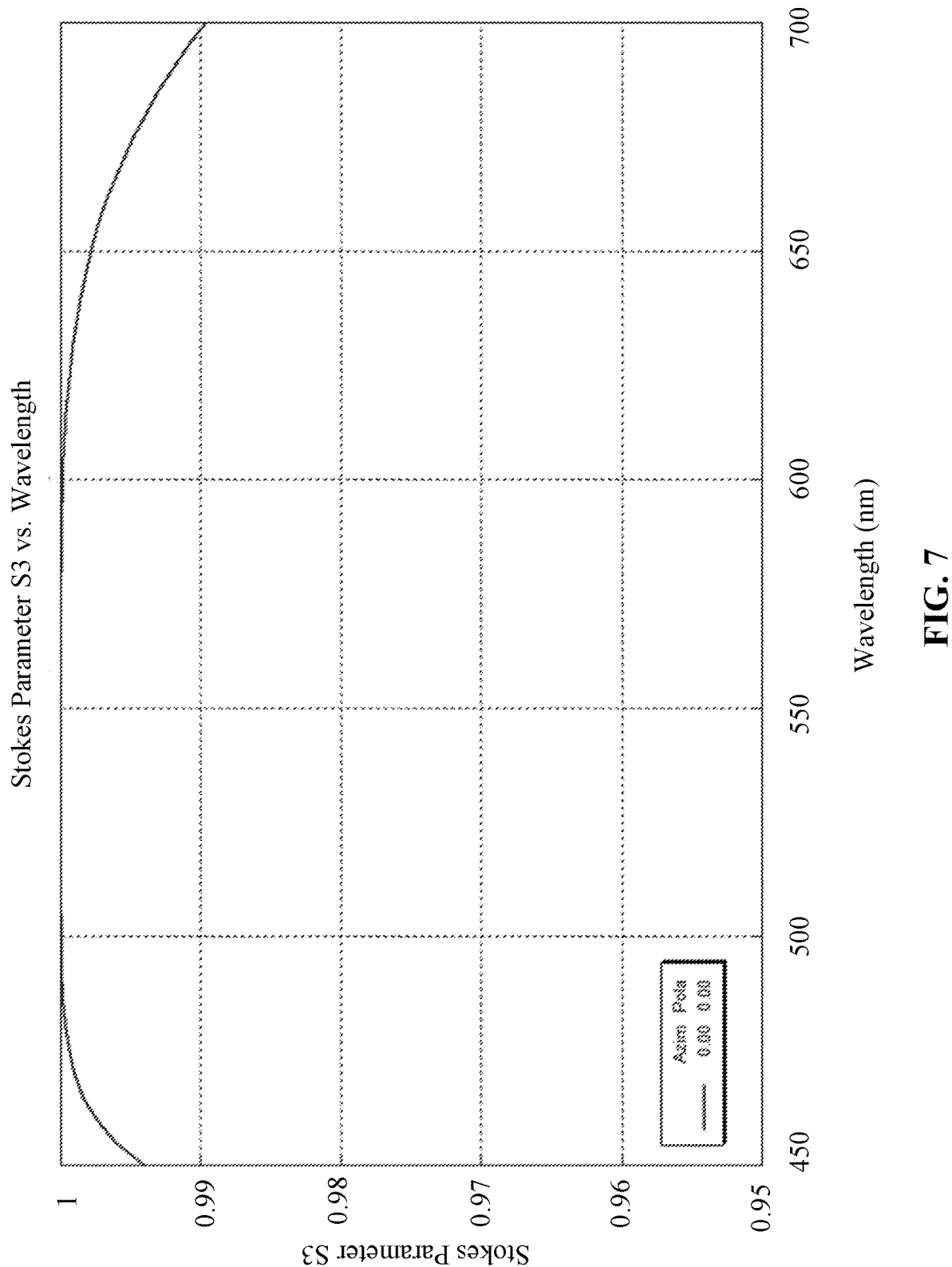

FIG. 6 and FIG. 7 respectively illustrate the simulation results regarding the large acceptance angle and broadband performance of the optical waveplate 100 at the first state shown in FIG. 5A. FIG. 6 illustrates the simulation results showing a relationship between the polar angles (e.g., incident angles) and the Stokes parameter S3 of the light transmitted through the optical waveplate 100, i.e., the output light. As shown in FIG. 6, the horizontal axis is the polar angle, and the vertical axis is the Stokes parameter S3. The relationship between the polar angles and the Stokes parameter S3 is determined at wavelengths of 450 nm, 550 nm, and 650 nm, respectively. FIG. 6 shows that, at wavelengths of 450 nm, 550 nm, and 650 nm, for a wide range of polar angles (e.g., 0° to about 35°), the Stokes parameter S3 of the output light may remain at or above 0.9, which is close to 1.0.

A person skilled in the art understands that the right-handed circularly polarized light has the Stokes parameter S3=1.0. As the Stokes parameter S3 approaches 1, the output light approaches a right-handed circularly polarized light. As shown in FIG. 6, for a wide range of polar angles, the output light of the optical waveplate 100 at the first state may be a right-handed circularly polarized output light (S3=1.0) or a substantially right-handed circularly polarized output light (S3≈1.0, e.g., S3≥0.9). That is, the optical waveplate 100 at the first state may be configured to reverse the handedness of the left-handed circularly polarized incident light (S3=−1.0) for a wide range of incident angles.

FIG. 7 illustrates the simulation results showing a relationship between the wavelength and the Stokes parameter S3 of the output light from the optical waveplate 100. As shown in FIG. 7, the horizontal axis is the wavelength (nm), and the vertical axis is the Stokes parameter S3. FIG. 7 shows that for a wide range of wavelengths (e.g., from about 450 nm to about 700 nm), the Stokes parameter S3 of the output light is at or above 0.99, which is close to 1.0. Thus, as shown in FIG. 7, for a wide range of wavelengths, e.g., from VIS region to NIR region, the output light of the optical waveplate 100 at the first state may be a right-handed circularly polarized output light (S3=1.0) or a substantially right-handed circularly polarized output light (S3≈1.0, e.g., S3≥0.99). That is, the optical waveplate 100 at the first state may be configured to reverse the handedness of the left-handed circularly polarized incident light (S3=−1.0) for a wide range of wavelengths, e.g., from VIS region to NIR region. In other words, the optical waveplate 100 at the first state may have the broadband performance.

Figure 8:
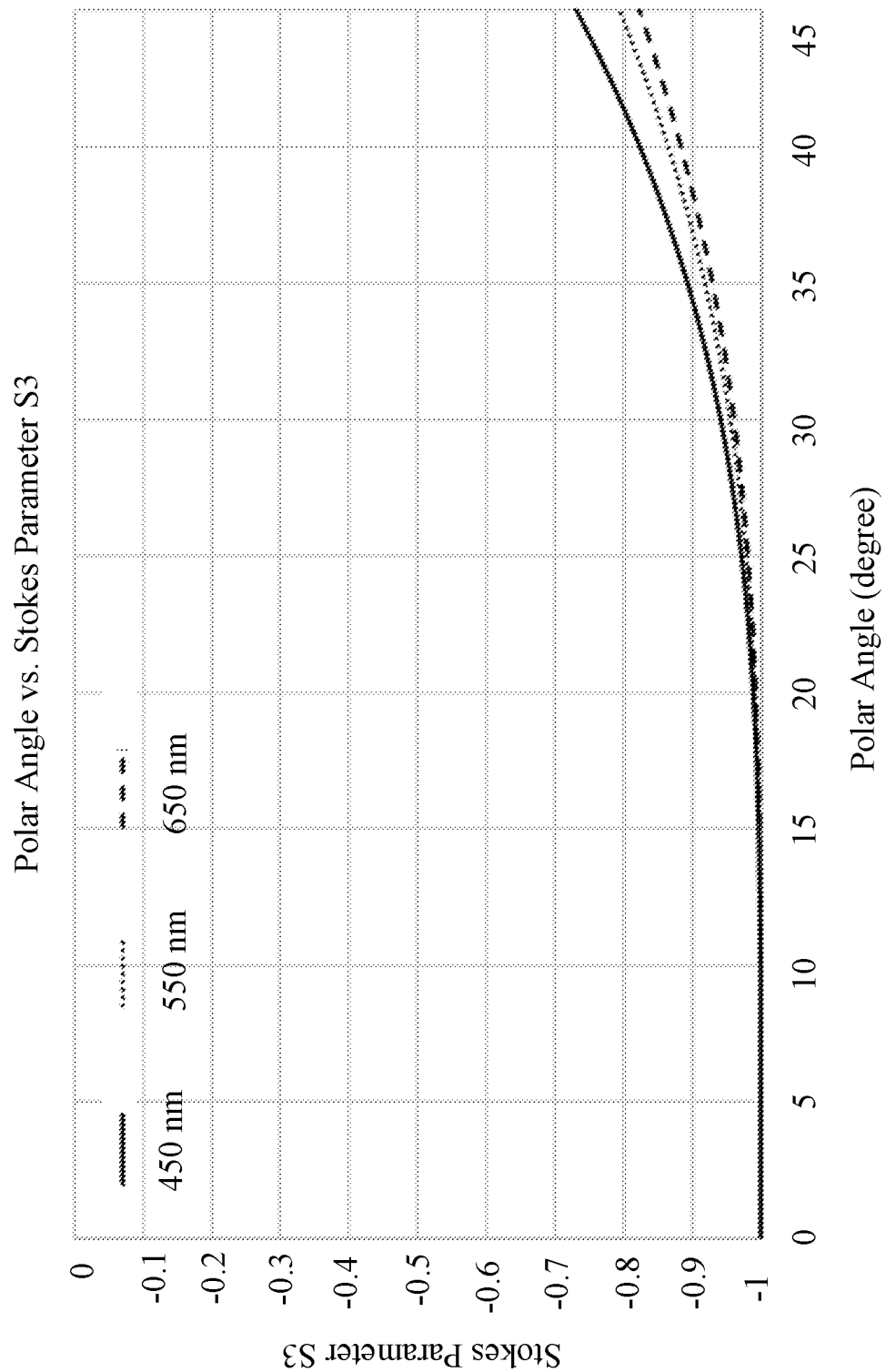
FIGS. 8 and 9 illustrate simulation results regarding broadband and large acceptance angle performance of the optical waveplate shown in FIG. 5B.
Figure 9:
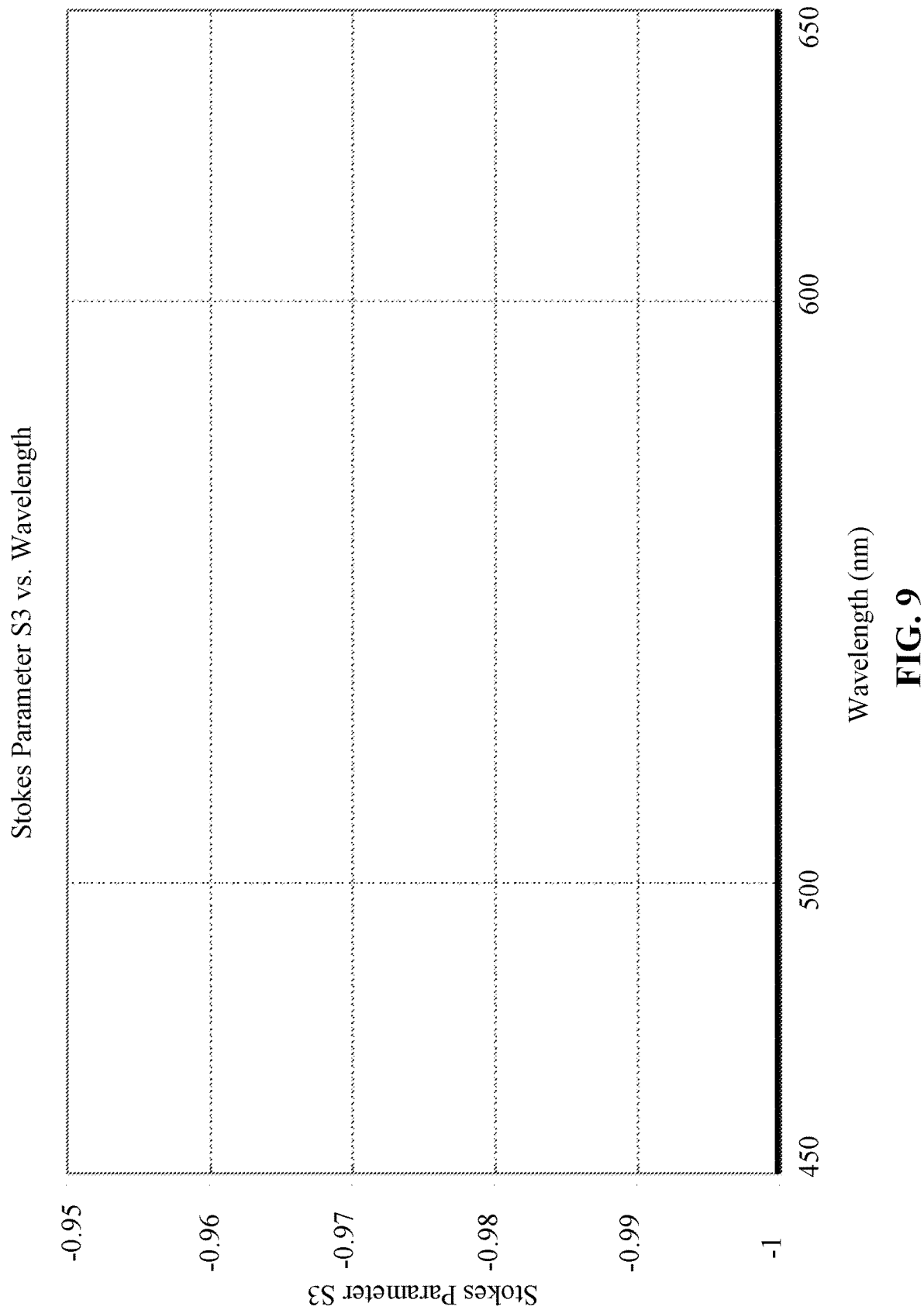

FIG. 8 and FIG. 9 respectively illustrate the simulation results regarding the large acceptance angle and broadband performance of the optical waveplate 100 at the second state shown in FIG. 5B. FIG. 8 illustrates the simulation results showing a relationship between the polar angles (e.g., incident angles) and the Stokes parameter S3 of the output light from the optical waveplate 100. As shown in FIG. 8, the horizontal axis is the polar angle, and the vertical axis is the Stokes parameter S3. The relationship between the polar angles and the Stokes parameter S3 is determined at wavelengths of 450 nm, 550 nm, and 650 nm, respectively. FIG. 8 shows that at wavelengths of 450 nm, 550 nm, and 650 nm, for a wide range of polar angles (e.g., 0° to about 35°), the Stokes parameter S3 of the output light may remain at or lower than −0.9, which is close to −1.0. Thus, as shown in FIG. 8, for a wide range of polar angles, the output light of the optical waveplate 100 at the second state may be maintained as a left-handed circularly polarized output light (S3=−1.0) or a substantially left-handed circularly polarized output light (S3≈−1.0, e.g., S3≥−0.9). That is, the optical waveplate 100 at the second state may be configured to maintain the handedness of the left-handed circularly polarized incident light (S3=−1.0) for a wide range of incident angles.

FIG. 9 illustrates the simulation results showing a relationship between the wavelength and the Stokes parameter S3 of the output light from the optical waveplate 100. As shown in FIG. 9, the horizontal axis is the wavelength (nm), and the vertical axis is the Stokes parameter S3. FIG. 9 shows that the Stokes parameter S3 of the output light remains constant at about 1.0 for a wide range of wavelengths (e.g., from about 450 nm to about 650 nm). Thus, according to FIG. 8, for a wide range of wavelengths, e.g., from VIS region to NIR region, the output light of the optical waveplate 100 at the second state may be a left-handed circularly polarized light (S3=−1.0) or a substantially left-handed circularly polarized light (S3≈−1.0). That is, the optical waveplate 100 at the second state may be configured to maintain the handedness of the left-handed circularly polarized incident light (S3=−1.0) for a wide range of wavelengths, e.g., for a wide range of wavelengths from VIS region to NIR region. In other words, the optical waveplate 100 at the second state may have the broadband performance.

Figure 10A:
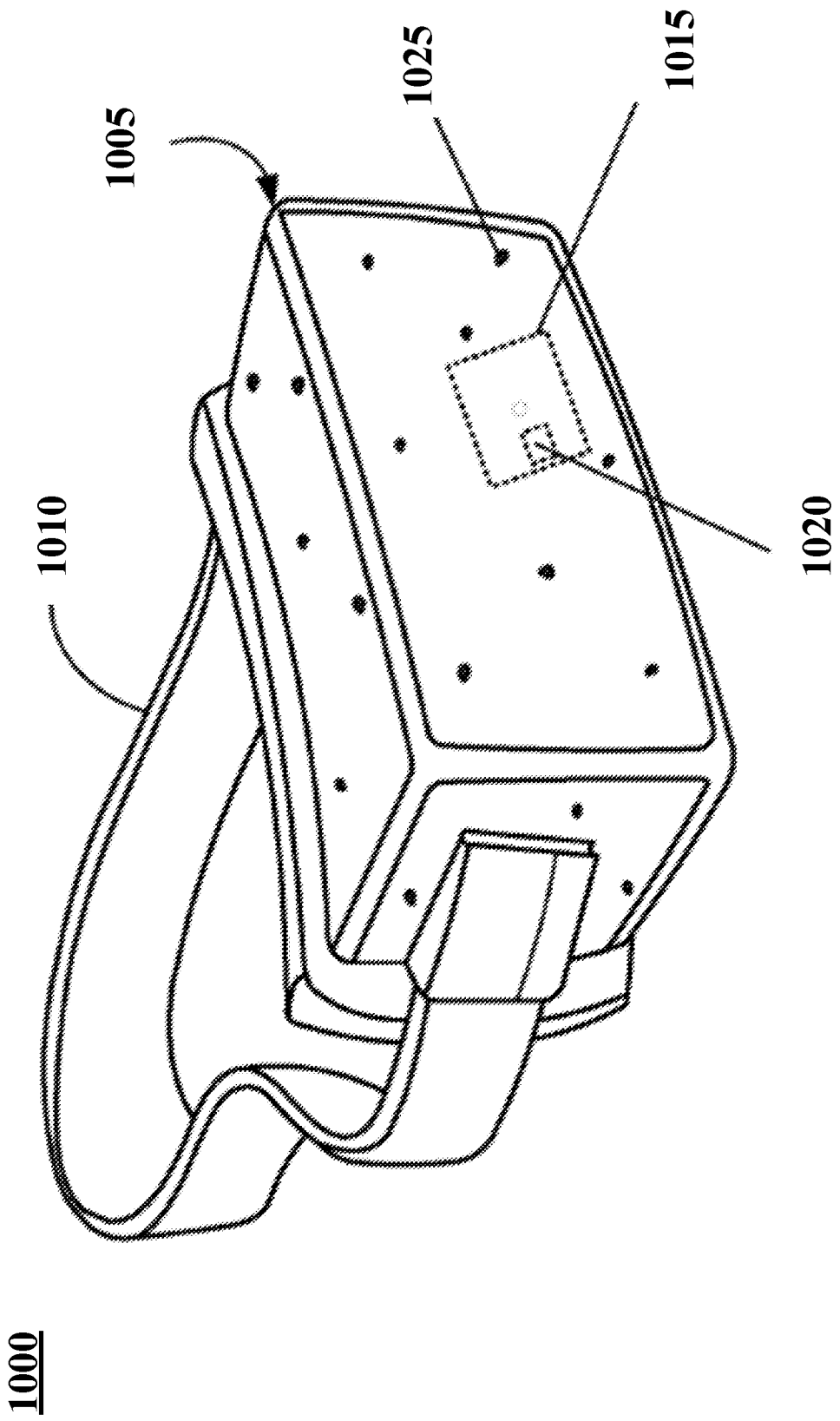
FIG. 10A illustrates a schematic diagram of a near-eye display ("NED") according to an embodiment of the disclosure.
Figure 10B:
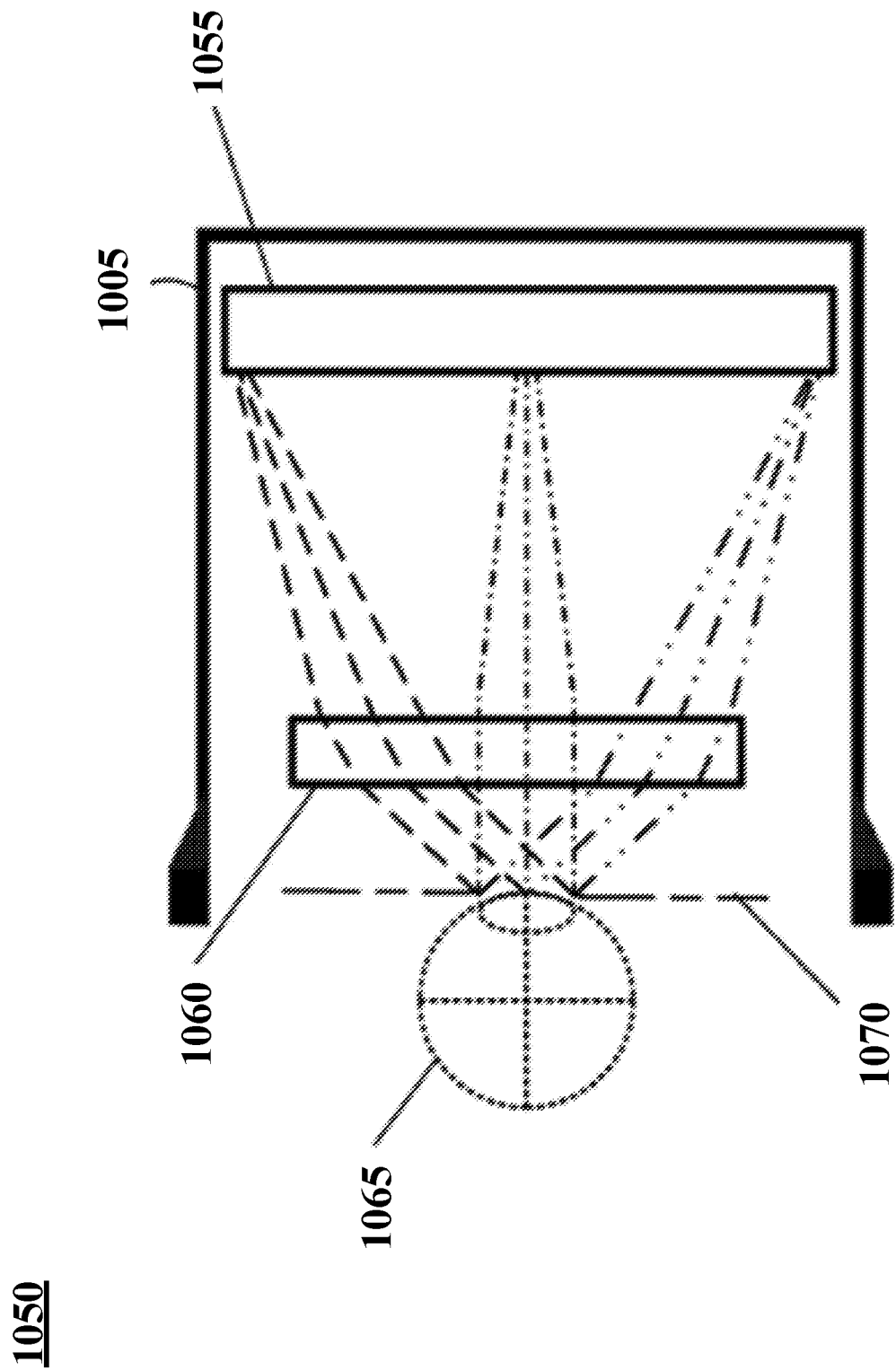
FIG. 10B illustrates a cross section of a front body of the near-eye display shown in FIG. 10A.

The disclosed optical waveplates may have wide applications in various instruments and optical systems, for example, a near-eye display ("NED") for virtual-reality ("VR"), augmented-reality ("AR") and/or mixed-reality ("MR") applications. FIG. 10A illustrates a schematic diagram of a near-eye display ("NED") 1000 according to an embodiment of the disclosure; and FIG. 10B illustrates a cross sectional view of a front body of the near-eye display shown in FIG. 10A. The NED 1000 may include one or more of the disclosed optical waveplates (e.g., waveplate 100).

As shown in FIG. 10A, the NED 1000 may include a front body 1005 and a band 1010. The front body 1005 may include one or more electronic display elements of an electronic display (not shown), an inertial measurement unit ("IMU") 1015, one or more position sensors 1020, and one or more locators 1025. In the embodiment shown in FIG. 10A, the one or more position sensors 1020 may be located within the IMU 1015, and neither the IMU 1015 nor the position sensors 1020 may be visible to the user. The NED 1000 may function as a VR, AR, and/or MR device. When the NED 1000 functions as an AR or MR device, portions of the NED 1000 and its internal components may be at least partially transparent.

As shown in FIG. 10B, the front body 1005 may include an electronic display 1055 and a varifocal block 1060 that together provide an image light to an exit pupil 1070. The exit pupil 1070 may be a location of the front body 1005 where a user's eye 1065 is positioned. In addition, the NED 1000 may include an eye-tracking system (not shown). The NED 1000 may present electronic content via the electronic display 1055 to a user who wears the NED 1000 at a focal distance. The varifocal block 1060 may be configured to adjust the focal distance in accordance with instructions from the NED 1000 to, e.g., mitigate vergence accommodation conflict of eyes of the user. The focal distance may be adjusted by adjusting an optical power associated with the varifocal block 1060, for example, by adjusting the optical power associated with one or more optical lenses in the varifocal block 1060.

Figure 10C:
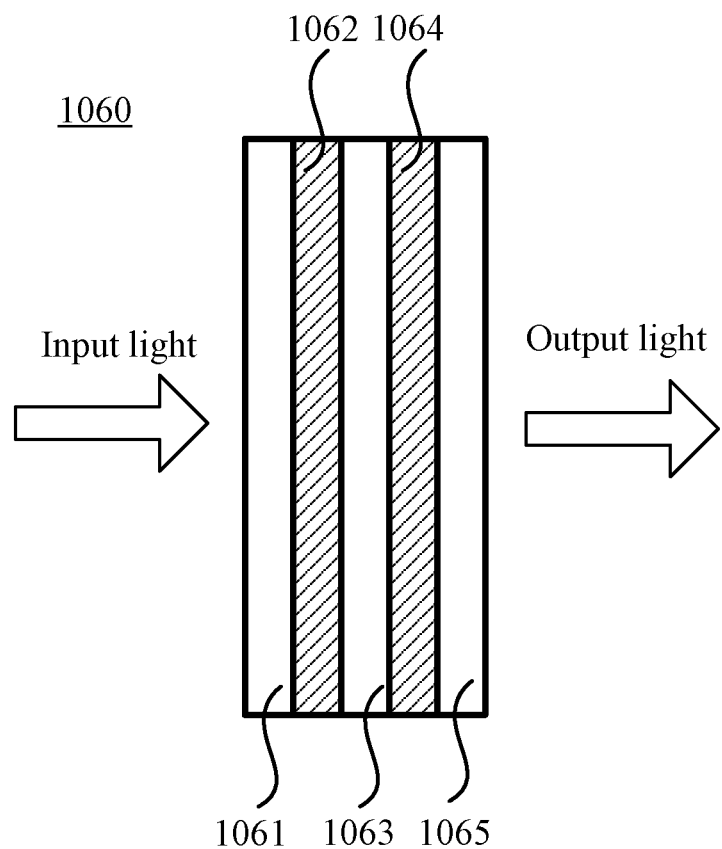
FIG. 10C illustrates a schematic diagram of a varifocal block according to an embodiment of the disclosure.

FIG. 10C illustrates a schematic diagram of a varifocal block 1060 according to an embodiment of the disclosure. In some embodiments, the varifocal block 1060 may include Pancharatnam Berry Phase ("PBP") liquid crystal ("LC") lenses 1061, 1063, and 1065, and switchable half-wave plates ("SHWPs") 1062 and 1064 alternately arranged. In some embodiments, the PBP LC lens (1061, 1063, or 1065) may be operated in an additive state (which may add an optical power to the varifocal block 1060) when receiving a right-handed circularly polarized ("RHCP") light. In some embodiments, the PBP LC lens (1061, 1063, or 1065) may be operated in a subtractive state (which may subtract an optical power from the varifocal block 1060) when receiving a left-handed circularly polarized ("LHCP") light.

Each of the SHWPs 1062 and 1064 may be a half-wave plate that transmits a polarized light of a specific handedness in accordance with an operating state. The varifocal block 1060 may control the handedness of a circularly polarized light in accordance with an operating state of a SHWP. The operating state of the SHWP may include a switching state and a non-switching state. In some embodiments, the SHWP in the switching state may provide a half-wave retardance to reverse the handedness of the circularly polarized incident light, and the SHWP in the non-switching state may provide a substantially zero retardance and maintain the handedness of the circularly polarized light. Thus, an SHWP placed upstream of a PBP LC lens (1061, 1063, or 1065) in a path of an incident light may be configured to control whether the PBP LC lens (1061, 1063, or 1065) functions in an additive or subtractive state by controlling the handedness of the circularly polarized light incident onto the PBP LC lens (1061, 1063, or 1065). Thus, the PBP LC lens (1061, 1063, or 1065) may be switchable between the additive state and the subtractive state via switching the SHWP placed upstream of the PBP LC lens (1061, 1063, or 1065). Each PBP LC lens (1061, 1063, or 1065) may be configured to be in the additive state or the subtractive state via controlling the operating state of the SHWP placed upstream of the PBP LC lens (1061, 1063, or 1065) and, thus, each PBP LC lens (1061, 1063, or 1065) may provide a positive or negative optical power. Accordingly, the three PBP LC lenses (1061, 1063, and 1065) may provide a plurality of combinations of optical powers, and the plurality of combinations of optical powers may provide a range of adjustment of optical power for the varifocal block 1060. Accordingly, the varifocal block 1060 may provide a range of adjustment of the optical powers to adapt for human eye vergence-accommodation.

In some embodiments, each of the SHWPs 1062 and 1064 may be any one of the disclosed optical waveplate (e.g., waveplate 100), such as the one having the switchable configurations shown in FIGS. 5A and 5B. Because the disclosed optical waveplate (e.g., waveplate 100) has broadband performance, a large acceptance angle, a low residual retardance, a fast response, and a capability of being switched between different states of retardance, the varifocal block 1060 may be configured to provide various optical powers to adapt for human eye vergence-accommodation in a fast and accurate fashion over a wide range of incident angles and a wide range of incident wavelengths. The design of the varifocal block 1060 including a structure of the stacked PBP LC lenses 1061, 1063, and 1065, as shown in FIG. 10C, is merely for illustrative purposes, and other designs of the varifocal block 1060 may be used according to various application scenarios.

The above-mentioned applications of the optical waveplate (e.g., waveplate 100) in the NEDs are merely for illustrative purposes. In some embodiments, the disclosed optical waveplates may also be used to realize eye-tracking components, display resolution enhancement components (e.g., increasing pixel density), and pupil steering elements, etc. The optical waveplates have broadband performance such as covering wavelengths from VIS to NIR regions, a large acceptance angle (i.e., a large incident angle), a low residual retardance, a fast response, and a capability of being switched between, for example, a substantially zero retardance and a non-zero retardance value. Thus, the optical waveplates may be implemented as multifunctional optical components in the NEDs to significantly improve the optical performance of the NEDs.

The foregoing description of the embodiments of the disclosure have been presented for the purpose of illustration. It is not intended to be exhaustive or to limit the disclosure to the precise forms disclosed. Persons skilled in the relevant art can appreciate that modifications and variations are possible in light of the above disclosure.

Some portions of this description may describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or a combination thereof. The PLD may be a complex programmable logic device ("CPLD"), a field-programmable gate array ("FPGA"), etc.

Embodiments of the disclosure may also relate to a product that is produced by a computing process described herein. Such a product may include information resulting from a computing process, where the information is stored on a non-transitory, tangible computer readable storage medium and may include any embodiment of a computer program product or other data combination described herein.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. An optical waveplate, comprising:
 a stack of a plurality of liquid crystal ("LC") layers including a first LC layer and a second LC layer, wherein the first LC layer includes LC molecules that are in-plane switchable by an external field to switch the optical waveplate between states of different phase retardances, and wherein when the optical waveplate operates at a substantially zero phase retardance state, an absolute value of a difference between an azimuthal angle of an effective refractive index ellipsoid of the first LC layer and an azimuthal angle of the effective refractive index ellipsoid of the second LC layer is 90°.

2. The optical waveplate according to claim 1, wherein the first LC layer is a ferroelectric liquid crystal ("FLC") layer including FLC molecules that are in-plane switchable by the external field.

3. The optical waveplate according to claim 2, wherein the azimuthal angle of the effective refractive index ellipsoid of the FLC layer is switchable via an in-plane switching of the FLC molecules by the external field.

4. The optical waveplate according to claim 2, wherein the FLC layer is operable under an electrically suppressed helix ferroelectric liquid crystal ("ESHFLC") mode.

5. The optical waveplate according to claim 2, wherein the FLC layer is sandwiched between two electrodes configured to apply the external field to the FLC layer.

6. The optical waveplate according to claim 1, wherein the first LC layer is an active LC layer.

7. The optical waveplate according to claim 1, wherein the first LC layer is an active FLC layer including FLC molecules that are in-plane switchable by the external field, and the active FLC layer is sandwiched between two electrodes that apply the external field to the FLC layer.

8. The optical waveplate according to claim 1, wherein the second LC layer is a passive layer configured to provide a constant phase retardance.

9. The optical waveplate according to claim 8, wherein the passive layer includes a liquid crystal polymer layer.

10. The optical waveplate according to claim 1, wherein:
the plurality of LC layers includes four FLC layers,
the four FLC layers satisfy $|\psi 1 - \psi 2| = 90°$ and $|\psi 3 - \psi 4| = 90°$ when the optical waveplate operates at the substantially zero phase retardance state, and
$\psi 1$ and $\psi 2$ represent azimuthal angles of effective refractive index ellipsoids of a first pair of two adjacent FLC layers, and $\psi 3$ and $\psi 4$ represent azimuthal angles of the effective refractive index ellipsoids of a second pair of two adjacent FLC layers.

11. The optical waveplate according to claim 1, wherein two or more of the plurality of LC layers include LC molecules that are in-plane switchable by the external field to switch the optical waveplate between the states of different phase retardances.

12. The optical waveplate according to claim 1, wherein the azimuthal angle of the effective refractive index ellipsoid of the first LC layer and a thickness of the first LC layer are configured, such that the plurality of LC layers provide an amount of phase retardance that is substantially wavelength independent over a range of wavelengths, and wherein the amount of phase retardance is substantially constant over a range of incident angles.

13. The optical waveplate according to claim 1, wherein the azimuthal angle of the effective refractive index ellipsoid of each of the plurality of LC layers and a thickness of each of the plurality of LC layers are configured, such that the plurality of LC layers provide an amount of phase retardance that is substantially wavelength independent over a range of wavelengths, and wherein the amount of phase retardance is substantially constant over a range of incident angles.

14. An optical lens assembly, comprising:

an optical lens; and an optical waveplate coupled with the optical lens, wherein optical waveplate includes:

a stack of a plurality of liquid crystal ("LC") layers including a first LC layer and a second LC layer, wherein the first LC layer includes LC molecules that are in-plane switchable by an external field to switch the optical waveplate between states of different phase retardances, and wherein when the optical waveplate operates at a substantially zero phase retardance state, an absolute value of a difference between an azimuthal angle of an effective refractive index ellipsoid of the first LC layer and an azimuthal angle of the effective refractive index ellipsoid of the second LC layer is 90°.

15. The optical lens assembly according to claim 14, wherein the first LC layer is a ferroelectric liquid crystal ("FLC") layer including FLC molecules that are in-plane switchable by the external field.

16. The optical lens assembly according to claim 15, wherein the azimuthal angle of the effective refractive index ellipsoid of the FLC layer is switchable via an in-plane switching of the FLC molecules by the external field.

17. The optical lens assembly according to claim 15, wherein the FLC layer is operable under an electrically suppressed helix ferroelectric liquid crystal ("ESHFLC") mode.

18. The optical lens assembly according to claim 14, wherein the optical lens is a Pancharatnam Berry Phase ("PBP") liquid crystal ("LC") lens.

* * * * *